US012674441B2

(12) United States Patent　　　　(10) Patent No.:　US 12,674,441 B2
Ozimec　　　　　　　　　　　　　　(45) Date of Patent:　　　Jul. 7, 2026

(54) PULSED ELECTROMAGNETIC PROPULSION SYSTEM

(71) Applicant: Zoran Ozimec, Zagreb (HR)

(72) Inventor: Zoran Ozimec, Zagreb (HR)

( * ) Notice: Subject to any disclaimer, the term of this patent is extended or adjusted under 35 U.S.C. 154(b) by 488 days.

(21) Appl. No.: 18/355,464

(22) Filed: Jul. 20, 2023

(65) Prior Publication Data

US 2024/0044316 A1　Feb. 8, 2024

Related U.S. Application Data

(60) Provisional application No. 63/395,447, filed on Aug. 5, 2022.

(51) Int. Cl.
　H01F 7/06　　　(2006.01)
　B64G 1/40　　　(2006.01)
　F03G 7/00　　　(2006.01)
　H01F 7/20　　　(2006.01)
(52) U.S. Cl.
　CPC ............. F03G 7/025 (2021.08); B64G 1/417 (2023.08); H01F 7/064 (2013.01); H01F 7/202 (2013.01)
(58) Field of Classification Search
　CPC ......... F03G 7/025; B64G 1/417; B64G 1/409; B64G 1/411; B64G 1/413; B64G 1/415; B64G 1/422; B64G 1/423; B64G 1/425; B64G 1/44; B64G 1/1081; B64G 1/242; B64G 1/2427; B64G 1/244; B64G 1/6462; H01F 7/064; H01F 7/202; H01F 7/20; H01F 1/00; H01F 13/00; H01F 7/0278; H01F 2007/086; H01F 7/02;

H01F 7/14; H01F 7/1844; F03H 99/00; F03H 1/0068; F03H 1/0081; F03H 1/0012; H02K 1/06; B60L 2200/10; B60L 50/72; B60L 50/70; B60L 58/32; B60L 2240/36; B60L 58/30; B60L 58/33; B60L 15/005; B60L 2220/12
See application file for complete search history.

(56)　　　　　References Cited

U.S. PATENT DOCUMENTS 6,118,193　A　*　9/2000　Morris ..................... E02D 17/18
　　　　　　　　　　　　　　　　　310/74
6,735,935　B2 *　5/2004　Hruby ...................... H05H 1/54
　　　　　　　　　　　　　　　　　60/202

(Continued)

*Primary Examiner* — John W Poos

(57)　　　　　　ABSTRACT

The present invention discloses propulsion system operating exclusively in electromagnetic domain. Only electromagnetic field and direct electric current are used to generate propulsion force. In exemplary embodiment two switchable electromagnets, one to generate electromagnetic field, the other to generate electromagnetic force are used. To disable electromagnetic reaction force on electromagnetic field generator, streams of independent but synchronized direct current pulses passing through two electromagnets are organized in the way that first electromagnet is always carrying current when magnetic field generated by second electromagnet reaches it, thus generating Laplace force, whereas, second electromagnet is never carrying current (open circuit) when magnetic field generated by the first electromagnet reaches it, which means, no Laplace reaction force ever occurs on second electromagnet. The system therefore does not depend on the emission of matter. Only electric current is needed.

16 Claims, 1 Drawing Sheet

1.

(56)          References Cited

U.S. PATENT DOCUMENTS 7,459,858 B2 * 12/2008 Hruby ...................... H05H 1/54
                                                   250/493.1
8,459,002 B2 *   6/2013 McLean .................. F03H 99/00
                                                   60/202
2014/0152227 A1 *   6/2014 Tuval ...................... F03H 99/00
                                                   310/10

* cited by examiner

1.

PULSED ELECTROMAGNETIC PROPULSION SYSTEM

CROSS-REFERENCE TO RELATED APPLICATIONS

This application claims the benefit of U.S. Provisional Application No. 6,339,5447, filed 5 Aug. 2022.

FIELD OF THE INVENTION

The present invention relates to propulsion, generating driving force capable of moving objects, vehicles, ships, etc. in any environment.

BACKGROUND OF THE INVENTION

All propulsion systems in use today are propellant dependent and work in accordance with Newton's third law of motion. To move any object, vehicle. ship etc. a reaction mass (propellant) is accelerated using energy (fuel) to generate force needed for propulsion. Emission of matter is making these systems unsuitable for space travel.

Among proposed alternatives to classical Newtonian propulsion systems are propellantless systems like solar sails that use photons to generate force (radiation pressure), some theoretical propulsion systems based on various quantum effects within quantum physics, notably quantum gravity and even proposals to change curvature of space-time in accordance with general theory of relativity. Unfortunately none of them have been tested outside the theoretical realm because technology needed to build them does not exist yet.

There are a few prior art examples, U.S. Pat. No. 8,459, 002 B2 being one of the characteristic ones close to the present invention, but they all utilize sinusoidal alternating currents for operation which is fundamentally different from direct current pulses used in the present invention. In mentioned prior art example physical and electronic time delays are added to alternating currents in an attempt to generate unidirectional electromagnetic force, but math tells us that such phase shifted superimposed periodic waveforms can only generate interference that is again periodic in nature, which means that the resulting electromagnetic force is not unidirectional and cannot be used for propulsion. Moreover, U.S. Pat. No. 8,459,002 B2 as well as other patents mentioned in said patent only claim propulsion force as a result of interference between alternating electromagnetic fields, without showing their exact superposition in the form of resulting electromagnetic force waveform which is unidirectional, usable for propulsion.

SUMMARY OF THE INVENTION

Present invention is about generating force needed for propulsion exclusively in electromagnetic domain meaning that no accelerating mass (propellant) is used. Origins of electromagnetic force in no way include mass acceleration. Only electromagnetic field and electric current are involved. In exemplary embodiment two electromagnets, one to generate electromagnetic field, the other to generate electromagnetic force are used.

Electromagnetic force interaction between two electromagnets is not instantaneous thus providing enough time to interfere with their interaction. That particular property combined with the ability to switch electromagnets on and off at will, as described in exemplary embodiment, allows us to completely and independently control electromagnetic forces on electromagnets using one for propulsion and disable another.

Invention, as described in exemplary embodiment but not limited to it, uses novel process as follows; streams of independent but synchronized direct current pulses passing through two electromagnets in the way that the first electromagnet is always carrying current when magnetic field generated by the second electromagnet reaches it thus generating Laplace force, while the second electromagnet is never carrying current (open circuit) when magnetic field generated by the first electromagnet reaches it, meaning that no Laplace reaction force ever occurs on the second electromagnet. In different embodiments active and passive electromagnetic field sources are used but always in total numbers of at least two or more.

DETAILED DESCRIPTION OF THE INVENTION

Science behind this invention is based on a definition of electromagnetic force field as a non-contact force acting anywhere in a field. Electromagnetic force field can also be viewed as a quantum field with photons as force carriers which is important for this invention because photons travel at speed of light meaning that electromagnetic interaction is not instantaneous, this being underlying property that makes this invention possible.

Practical idea of how this invention works is to initiate electromagnetic force interaction between a minimum of two distinctly separated controllable-switchable electromagnetic field sources attached to a common frame and to interfere with their electromagnetic force interaction by switching individual electromagnetic fields on and off in the way that electromagnetic force on one source is preserved whereas the electromagnetic force on the other is disabled. To keep electromagnetic force unidirectional as desired, direct current pulses are used in order to generate magnetic fields that do not change its direction.

Figure 1:
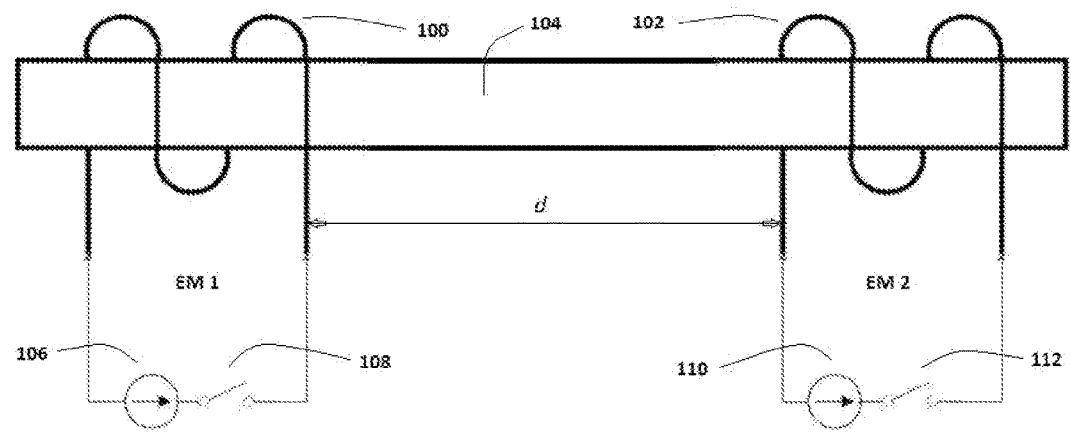
FIG. 1 shows basic hardware described in exemplary embodiment, two coils-electromagnets fixed on common frame and both coils connected to direct current sources through programmable electronic switches.

Exemplary embodiment of the invention (see FIG. 1) comprises two distinctly separated electromagnets 100 and 102 mechanically coupled to a common frame 104 and axially aligned in order to enable maximum electromagnetic force interaction between them. Each electromagnet is connected to a direct current source 106, 110 through programmable electronic switches 108, 112. Both switches are controlled independently by common programmable control unit (not shown).

Distance d between the two coils tells us how much time electromagnetic wave needs to travel between the two electromagnets $Td=d/c$ (c is speed of light). That time enables us to use electronic switches to control direct current pulses through two electromagnets in the way that the first electromagnet 100 is always carrying current (switch 108 closed) when reached by the magnetic field generated by the second electromagnet 102 thus generating Laplace force (propulsion), while the second electromagnet 102 is never carrying current (switch 112 open) when reached by the magnetic field generated by the first electromagnet 100 meaning that there is no Laplace reaction force on second electromagnet 102.

Process can be reversed if we want active force on second electromagnet 102 and no force on first electromagnet 100.

Transient phenomena which occur at moments when switches turn on and off are related to physical dimensions, geometry and inductance (length of the conductor) of the coils which are part of used electromagnets and to electrical properties of current sources and switches. Only after the transient time Tt a stable magnetic field is formed and it must be taken into consideration to prevent overlapping with the time management of the current pulses, which means it is important to keep Tt<Td. It is advisable to keep Tt as short as possible by keeping the inductance low by using a parallel connection of multiple short coils (single turn), for example.

Figure 2:
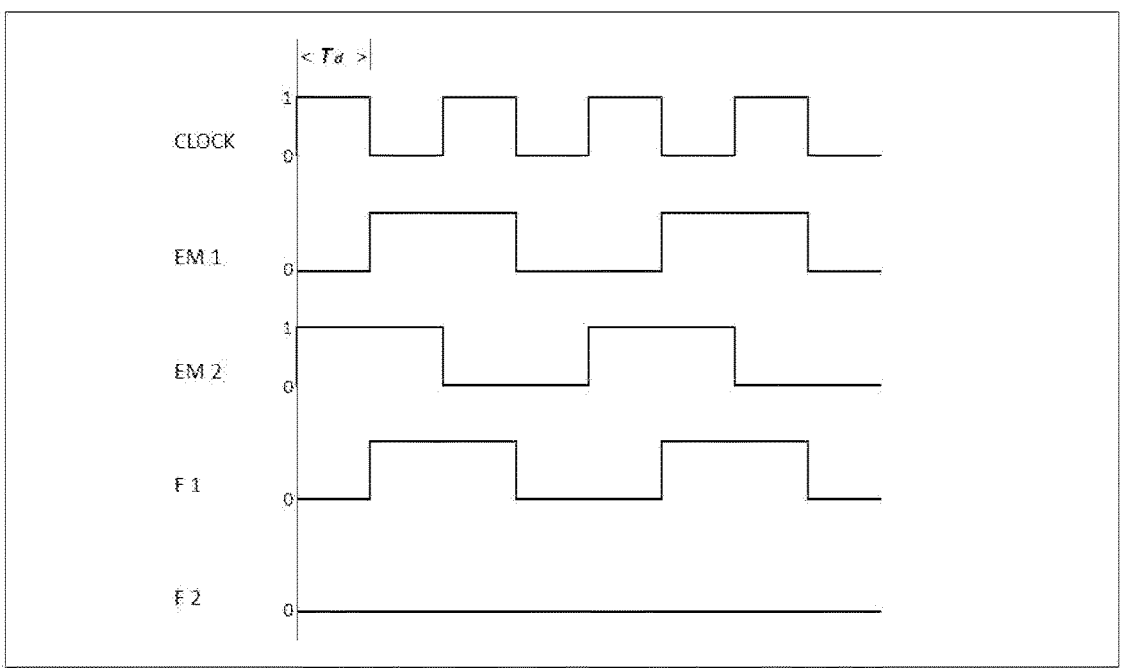
FIG. 2 shows timing diagram, as described in exemplary embodiment, of two cycles of direct current pulses applied to each electromagnet as well as electromagnetic forces acting on them, all synchronized to a common clock.

For the sake of clarity of this presentation we shall consider Tt<<Td and ignore Tt entirely. Detailed timing diagram of direct current pulses through both electromagnets EM 1 and EM 2 synchronized to master clock is shown in FIG. 2 including the forces acting on said electromagnets. Before a detailed description of pulse management I would like to point out that the same time interval Td is needed for both; for electromagnetic field to travel between the two electromagnets as well as to disappear after the current is switched off.

Detailed explanation of timing process as shown in FIG. 2 follows;

Phase 1: (from time 0 to Td) Before the start both switches 108, 112 are off (no electric current through coils and no active or residual electromagnetic field). At start (t=0) current switch 112 turns on enabling current through the second electromagnet 102 while the first electromagnet 100 stays off, 108 open circuit. After time period Td magnetic field generated by current in second electromagnet 102 reaches first electromagnet 100.

Phase 2: (from time Td to 2Td) At time point Td, the moment when magnetic field from the second electromagnet 102 reaches the first electromagnet 100, current through first electromagnet also switches on 108 generating Laplace propulsion force F1 on first electromagnet 100 because the magnetic field and the electric current coexist. This state (both electromagnets active) lasts until magnetic field from active first electromagnet reaches second electromagnet (time point 2Td).

Phase 3: (from time 2Td to 3Td) At time point 2Td, (magnetic field from the active first electromagnet reaches second electromagnet) to prevent magnetic reaction force F2 on second electromagnet 102, electronic switch 112 on second electromagnet turns off=open circuit, meaning there is no Laplace reaction force on second electromagnet 102. After that it takes another time interval Td (from 2Td to 3Td) for the magnetic field from the second electromagnet to disappear at the location of the first electromagnet (still active) disabling Laplace force F1 on the first electromagnet in the process.

Phase 4: (from time=3Td to 4Td) After time point 3Td there is no longer the magnetic field generated by the second electromagnet at the location of the first electromagnet and consequently there is no magnetic force acting on the first electromagnet, the current through the first electromagnet is no longer needed, and therefore the first switch 108 switches off at 3Td. After that the magnetic field generated by the first electromagnet needs another Td interval, until time point 4Td, to disappear at the place of the second electromagnet thus disabling all currents and magnetic fields. It is the required state for another cycle Phase 1 to Phase 4 to start and repeat as long as propulsion force F1 on the first electromagnet is wanted.

Second embodiment is the same as first, except for the second electromagnet being passive; the coil is simply short-circuited or closed with resistor. Any change in the magnetic field generated by the first electromagnet reaching short circuited coil will automatically generate current in it and consequently the Laplace force—propulsion force. First electromagnet needs to be in switched off phase when the induced electromagnetic field from the short circuited coil returns back to the first electromagnet, preventing reaction force on the first electromagnet.

Third embodiment is the same as first, except for the soft ferromagnetic core being used instead of the second electromagnet. The soft ferromagnetic core will be polarized in the magnetic field generated by the first electromagnet and will respond with electromagnetic force acting on ferromagnetic core serving as propulsion force. It is again important to switch off the first electromagnet before magnetic field from ferromagnetic core reaches the first electromagnet thus disabling reactive magnetic force on the first electromagnet.

Furthermore, this invention is not limited to any specific embodiment and it can use various types and shapes of electromagnets or electromagnetic field sources in general, active or passive, from simple current carrying wires of any shape (with or without magnetic core) to potentially more exotic current carriers or electromagnetic field generators. Additionally, more than two electromagnetic field sources can be used to optimize and enhance propulsion force generation. Moreover, various embodiments will require different timing procedures, however always based on the same basic principle covered with this invention which is to prevent reaction electromagnetic force by switching off active electromagnetic sources at the time intervals when reaction force would naturally occur.

What is claimed is:

1. A pulsed electromagnetic propulsion system comprising:

at least two electromagnetic field sources fixed to a common frame and separated by a predetermined distance, wherein the at least two electromagnetic field sources include a first electromagnet and a second electromagnet;

at least one electromagnetic field source having its own power source, as an active electromagnetic field source;

at least one direct current source connected to each active electromagnetic field source through programmable electronic switches; and a time management for the programmable electronic switches designed to send direct current pulses to the active electromagnetic field sources in order to preserve an electromagnetic force acting on one electromagnetic field source while disabling a reactive electromagnetic force acting on other electromagnetic field source, wherein the second electromagnet is replaced by a soft ferromagnetic core configured to operate as a passive electromagnetic field source.

2. The pulsed electromagnetic propulsion system of claim 1, wherein the placement and orientation of the electromagnetic field sources are axial in order to enable the electromagnetic force interaction between the electromagnetic field sources.

3. The pulsed electromagnetic propulsion system of claim 1, wherein the predetermined distance between the electromagnetic field sources is large enough to allow switching transient phenomena to stabilize, which means a static electromagnetic field generated by the direct current source is formed.

4. The pulsed electromagnetic propulsion system of claim 1, wherein the at least one electromagnetic field source is a conductor of any shape powered by a current source, which means it is the active electromagnetic field source.

5. The pulsed electromagnetic propulsion system of claim 1, wherein the at least one electromagnetic field source is a coil of any shape made of a conductor powered by a current source, which means it is the active electromagnetic field source.

6. The pulsed electromagnetic propulsion system of claim 5, wherein the coil is one turn of a wire-conductor, the coil being round, rectangular or any shape.

7. The pulsed electromagnetic propulsion system of claim 1, wherein the at least one electromagnetic field source is a short-circuited coil, which means it is the passive electromagnetic field source.

8. The pulsed electromagnetic propulsion system of claim 7, wherein a coil being one turn of a wire-conductor, the coil being, round, rectangular or any shape.

9. The pulsed electromagnetic propulsion system of claim 1, wherein the at least one electromagnetic field source is a core made of soft ferromagnetic material, which means it is the passive electromagnetic field source.

10. The pulsed electromagnetic propulsion system of claim 1, wherein the electromagnetic field sources and the programmable electronic switches are nanoscale structures fabricated on a silicon chip.

11. The pulsed electromagnetic propulsion system of claim 1, wherein multiple small electromagnetic field sources operate in parallel in order to increase the electromagnetic force.

12. The pulsed electromagnetic propulsion system of claim 1, wherein the predetermined distance between the electromagnetic field sources is larger than the length of a current conductor in an individual electromagnetic field source in order to prevent time overlapping with the time management for the programmable electronic switches.

13. The pulsed electromagnetic propulsion system of claim 1, wherein the time management for the programmable electronic switches manages the direct current pulses in a way that the first electromagnet is always carrying a current when a magnetic field generated by the second electromagnet reaches the first electromagnet thus generating a Laplace force, whereas the second electromagnet is never carrying the current (open circuit) when the magnetic field generated by the first electromagnet reaches the second electromagnet, which means no Laplace reaction force occurs on the second electromagnet.

14. The pulsed electromagnetic propulsion system of claim 1, wherein an individual direct current pulses lasts twice the time an electromagnetic field needs to travel the predetermined distance between the electromagnetic field sources.

15. The pulsed electromagnetic propulsion system of claim 7, wherein the time management for the programmable electronic switches manages the direct current pulses in a way that the first electromagnet is never carrying current when a magnetic field generated by the second passive electromagnetic field source, the short-circuited coil, reaches the first electromagnet therefore never generating a Laplace force on the first active electromagnet, whereas, the second, passive electromagnetic field source is generating the electromagnetic force while activated-polarized when the magnetic field generated by the first electromagnet reaches it.

16. The pulsed electromagnetic propulsion system of claim 1, wherein the time management for the programmable electronic switches manages the direct current pulses in a way that the first electromagnet is never carrying current when a magnetic field generated by the second passive electromagnetic field source, the soft ferromagnetic core, reaches the first electromagnet therefore never generating a Laplace force on the first active electromagnet, whereas, the second, passive electromagnetic field source is generating the electromagnetic force while activated-polarized when the magnetic field generated by the first electromagnet reaches it.

* * * * *